FIG. I

INVENTORS
GEORGE H. KUNSTADT
WILLARD J. OPOCENSKY

Oct. 14, 1969  G. H. KUNSTADT ET AL  3,472,072
FLUID FLOW COMPUTER
Filed May 5, 1967  3 Sheets-Sheet 2
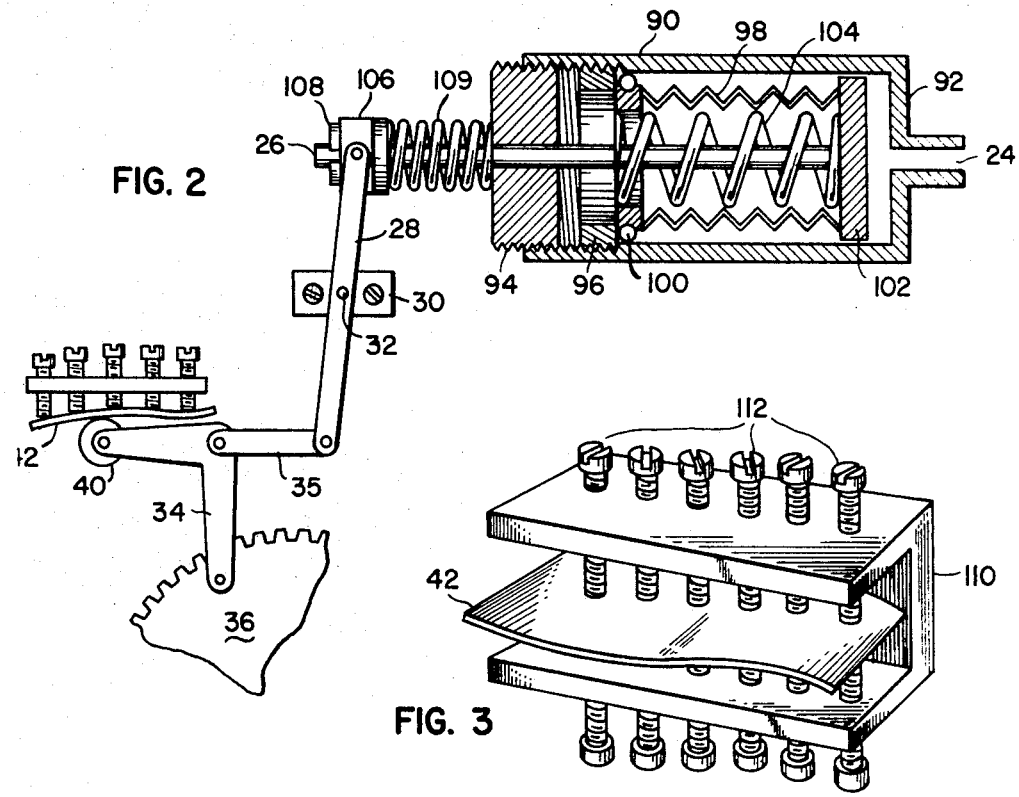
FIG. 2
FIG. 3
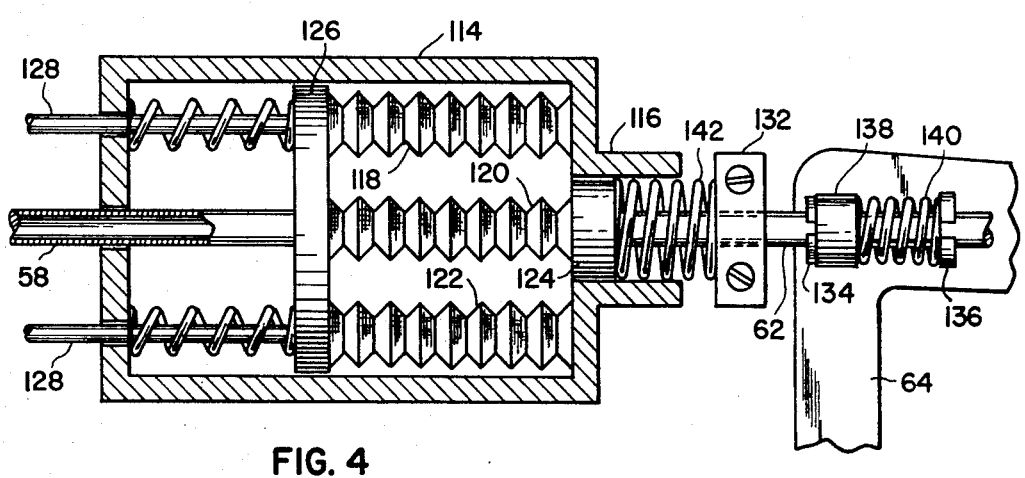
FIG. 4
INVENTORS
GEORGE H. KUNSTADT
WILLARD J. OPOCENSKY
BY
*Joseph Murgia*
ATTORNEY Oct. 14, 1969  G. H. KUNSTADT ETAL  3,472,072
FLUID FLOW COMPUTER
Filed May 5, 1967  3 Sheets-Sheet 3
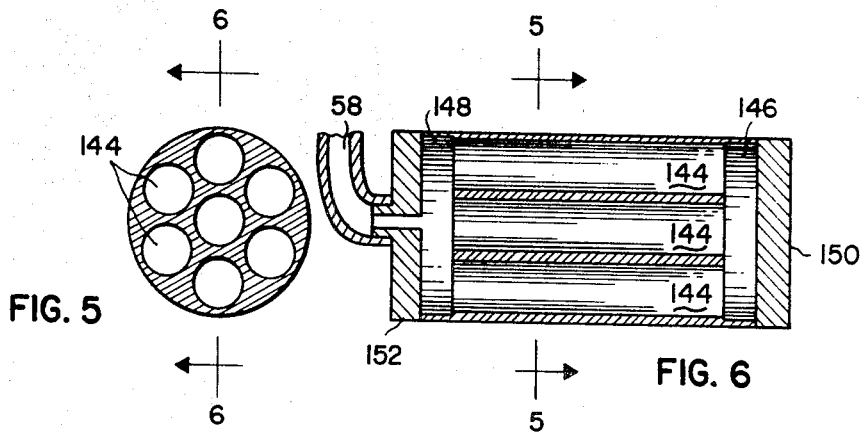
FIG. 5
FIG. 6
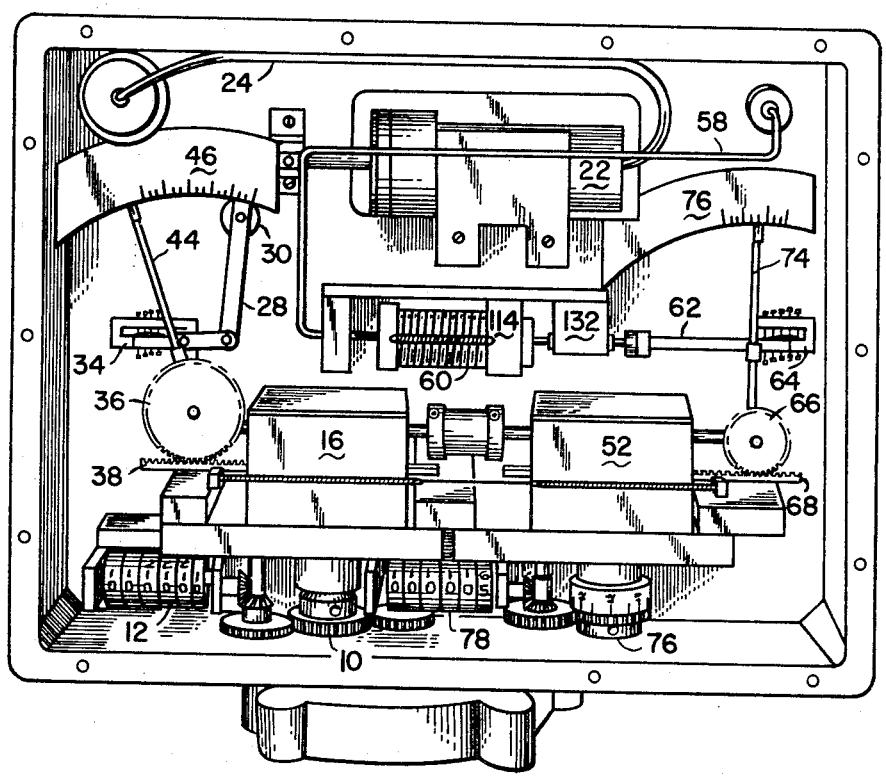
FIG. 7
INVENTORS
GEORGE H. KUNSTADT
WILLARD J. OPOCENSKY
BY
Joseph Dugan
ATTORNEY

United States Patent Office 3,472,072
Patented Oct. 14, 1969

3,472,072
FLUID FLOW COMPUTER
George H. Kunstadt, Tarzana, and Willard J. Opocensky, Glendale, Calif., assignors to Singer-General Precision, Inc., a corporation of Delaware
Filed May 5, 1967, Ser. No. 636,387
Int. Cl. G01f 23/02
U.S. Cl. 73—233       8 Claims

ABSTRACT OF THE DISCLOSURE

A mechanical computer which, when coupled to a gas flow meter, will compute the flow of gas through the flow meter after making corrections to a standard of pressure and temperature. In making the corrections, the multiplication and division computations are performed by serial connected ball and disk integrating units which are actuated by the flow meter and by bellows and linkage elements which have been provided with adjustable mechanisms to correct for non-linearity and to assure computing accuracy over a wide range of pressures and temperatures.

Background of the invention

Because the density of a fluid such as gas varies with pressure and temperature, it is well known that gas flow indicators which are associated with gas flow meters for providing an indication of total volume of gas passing through the meter only register an approximation of gas quantity. In order to obtain an accurate measure of gas quantity, it is necessary to perform computations which will correct the measured volume to some standard value of temperature and pressure. To accurately measure gas quantities, it is necessary to either measure gas flow with the gas itself adjusted to some standard of temperature and pressure, or measure the gas flow and mathematically correct it to that standard. Obviously, the latter method is the most practical and most easily accomplished.

Fluid flow computers have been used in conjunction with gas flow meters for many years and in nearly all cases perform the corrections by the use of integrating mechanisms driven by the rotating shafts of the flow meters, together with additional inputs supplied by the transducers which measure the temperature and pressure of the gas in the line. Since these computers must be operated solely by the energy available in the gas line, that is, the low output torque rotating shaft of the gas flow meter, together with the energy produced by pressure and temperature to a transducer, generally a Bourdon tube, it is most necessary that the computer-totalizer require a minimum amount of available power. Because of the low power availability for driving a flow computer, it is the present practice to construct such instruments with temperature or pressure transducers which, because of the low power availability, operate intermittently and only when there has been sufficient temperature or pressure change to overcome the inherent friction within the system. Thus, the integrating mechanism may continue to attempt its multiplication process without recognizing a change in temperature or pressure until the appropriate transducer suddenly reacts to the change and corrects the multiplying factor of the integrator. While the overall average accuracy of such a flow computer may be adequate, it is obviously inaccurate, especially when presented with small changes in pressure and temperature, and when computations are to be made over a short period.

The fluid flow computer described herein uses bellows transducers, which heretofore have been avoided because of their inherent nonlinearity over wide ranges. In the invention these nonlinearity errors, as well as errors caused by gas characteristics which deviate from the ideal gas laws, have been eliminated through the use of adjustable correcting cams in the various linkages of the computer. The resulting instrument, when properly adjusted, is capable of continuous and smooth operation and will provide computing accuracy of less than 0.5 percent over wide ranges of pressures and temperatures.

Brief summary of the invention

The invention comprises a fluid flow computer for correcting a flow of gas to a standard of pressure and temperature in accordance with the laws of Boyle and Charles, as well as for compensating for the actual behavior of non-ideal gases. The rotating output shaft of a flow meter in a gas line enters the computer and rotates the input disk of a ball and a disk integrator, the ball carriage of which is actuated by a pressure bellows responsive to the pressure on the gas line. The integrator output shaft drives a second integrator, which is reverse connected to produce division processes, and which is actuated by a unique differential bellows assembly which responds only to a temperature bulb placed in the gas line, and which is unaffected by temperatures within the computer housing. Bellows errors are corrected by novel adjustable cams connected into the mechanical linkage to assure an accurate and continuous output to a totalizing register or other types of output indicators, such as switch contacts which may be connected to signal transmission lines for remote indications of corrected gas flow.

Description of the drawings

In the drawings which illustrate a preferred embodiment of the invention:

FIGURE 2 is an illustration of the pressure bellows and mechanical linkage associated therewith;

FIGURE 3 is a perspective illustration of the adjustable cam mechanism used for correcting bellows errors;

FIGURE 4 is a detailed illustration of the differential temperature bellows and mechanical linkage associated therewith;

FIGURE 5 is a cross section view of the temperature bulb which is inserted in the gas line and which drives the temperature bellows.

FIGURE 6 is a vertical cross section illustration of the temperature bellows taken along the line 6—6 of FIGURE 5; and FIGURE 7 is an illustration of the gas flow computer unit with cover removed, illustrating the relative positions of the components of the instrument.

Detailed description

Figure 1:
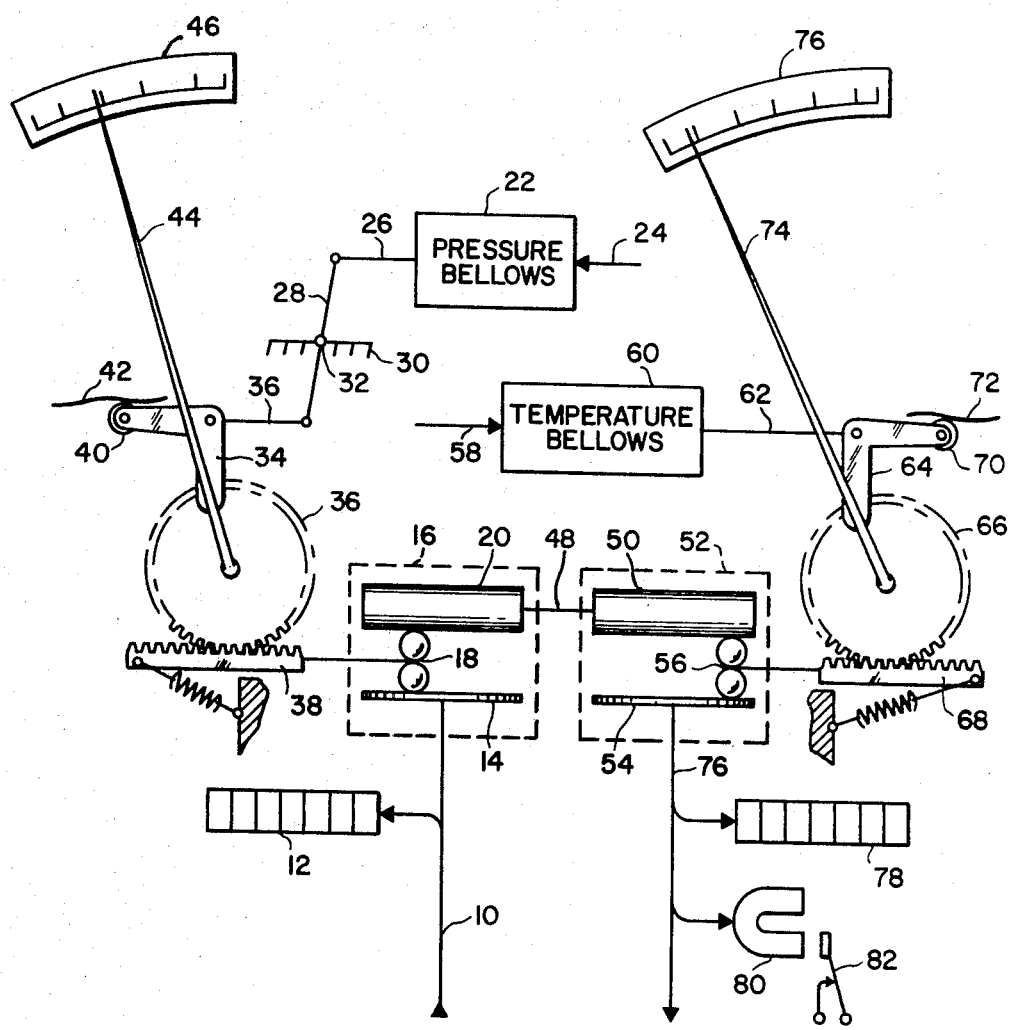
FIGURE 1 is a mechanical schematic illustration of the fluid flow computer.

Fluids, such as gasses, being pumped through gas lines are not maintained at constant temperatures or pressures. Accordingly, in order to obtain an accurate determination of quantity of gas flow, it is necessary that a measured volume of gas be corrected for temperature and pressure to a suitable standard. Such a correction must, of course, follow the laws of Boyle and Charles, which, for continuous computations for pressure and temperature variations, requires the continuous integration of pressure and temperature with respect to measured gas flow.

FIGURE 1 is a mechanical schematic diagram of an instrument for mechanizing the required equation. A flow meter coupled into the gas pipe line produces, as an output, a shaft rotation proportional to the volume of gas passing through the line. The instrument schematically illustrated in FIGURE 1 may be physically connected to the flow meter so the flow meter output shaft transmits rotation to input shaft 10 of the gas flow computer and totalizer. Input shaft 10 may be coupled to counter register 12, which totalizes the gas flow measured by the gas meter, and input shaft 10 is also coupled to the input disk 14 of a mechanical ball and disk integrator 16. Mechanical integrators are well known in the art and integrate through the use of transmission balls 18 which transmit the rotation of the input disk 14 to an output cylinder 20. Transmission balls 18 are positionable along the diameter of the disk 14 and the multiplication factor of the integrator is determined by the radial position of the transmission balls 18 from the center, or zero position, of the input disk 14. Thus, the rotation of input disk 14 is transmitted to the output cylinder in accordance with the radial position of the transmission balls 18, which, in the present embodiment, are driven to a radial displacement representing the gas pressure in the gas line. Transmission balls 18 are actuated along the diameter of disk 14 by the force exerted by pressure bellows 22 which is connected to the gas line by a pressure input tube 24. An increase in gas pressure in the gas line exerts a pressure on bellows 22, which imparts motion to bellows push rod 26. Pivotally connected to push rod 26 is a rocker arm 28 which is connected to a stationary member 30 by a pivot 32, so that, at the opposite end of rocker arm 28, motion of an opposite direction is produced. The motion of rocker arm 28 is translated to the center portion of an elbow link 34 by a connecting link 35 which is pivotally coupled to elbow link 34 and rocker arm 28. One arm of elbow link 34 is pivotally coupled to a spur gear 36 which engages rack gear 38 to drive the carriage of transmission balls 18. The second arm of elbow link 34 is equipped with a roller 40 which engages adjustable cam 42, which, as will be hereinafter explained in detail, may be adjusted to correct for nonlinearities in the pressure bellows 22 and associated linkages.

In the embodiment illustrated in FIGURE 1, the pressure linkage system is provided with an indicator which may be calibrated to display the instantaneous pressure being applied through the pressure input tube 24 to the pressure bellows 22. This indicator system is comprised of a needle indicator 44 which may be affixed along a radius of spur gear 36, so that angular rotation of spur gear 36 will actuate the indicator 44. Needle indicator 44 may be positioned adjacent a placard 46 imprinted with suitable indications representing the gas pressure sensed by bellows 22.

As previously noted, the rotation of integrator input disk 14 is transmitted to output cylinder 20 in accordance with the radial position of the transmission balls 18 which are controlled by pressure bellows 22. The rotation of output cylinder 20 is translated to an output shaft 48 which in turn is coupled directly to the "output" cylinder 50 of a second integrator 52. It should be noted that the normal operation of any ball and disc integrator contemplates the rotating input disk as being the standard input element and the cylinder as being the output element. In this specific application a division process is desired in accordance with the law of Charles; therefore, in this particular application the input rotation is imparted directly to cylinder 50 and the output is withdrawn from disk 54 in accordance with the radial position of the carriage supporting transmission balls 56.

Transmission balls 56 are positioned in accordance with the temperature of the gas in the gas transmission line. The temperature bulb, which will be explained in detail in connection with FIGURES 5 and 6, is positioned in the gas line and contains a liquid having a relatively large coefficient of expansion. As the temperature in the gas line varies, the volume of the liquid varies accordingly, and a tubing 58 transmits this variation to temperature bellows 60, which also contains a volume of liquid and which is forced to contract or expand accordingly. The variations in temperature bellows 60 is transmitted to a bellows shaft 62, which is pivotally linked to the center section of an elbow link 64, one arm of which is pivotally connected to spur gear 66 which meshes with rack gear 68, which is connected to impart motion to the carriage supporting transmission balls 56. The other arm of elbow link 64 is provided with a roller 70 which rides against an adjustable cam 72 which may be adjusted to correct for gas compressibility factors and for nonlinearity in the temperature bellows system and associated linkage. As in the pressure portion of the computer, the temperature portion may be provided with an indicating system comprising a needle indicator 74 radially attached to spur gear 66, and a placard 76 which may be calibrated to indicate the temperature being sensed by temperature bellows 60.

The output obtained from disk 54 of integrator 52 may be applied through a shaft 76 to a counter register 78 which totalizes the metered gas after the computations have been made to correct for temperature and pressure. In addition, output shaft 76 may, if desired, be coupled to other output devices, such as a rotatable magnet 80 which actuates electrical contacts 82 or to an analog to digital encoder which may be connected to a remote recording station.

FIGURE 2 is a cross section view of the pressure bellows assembly and its associated linkage. The pressure bellows assembly comprises a tubular housing 90 having an end cap 92 through which extends the pressure input tube 24. The opposite end of tubular housing 90 is provided with an internal thread into which is threaded a plug 94. Also engaging the threaded portion of housing 90 is a threaded ring 96 which is used as an abutment for bellows 98, as shown in FIGURE 2. Bellows 98 may be provided with an O-ring seal 100 to prevent gas leakage between the external and internal portions of bellows 98 and is also provided with an end cap 102 on the end of bellows 98 adjacent the pressure input tube 24. End cap 102 is connected to bellows push rod 26 which extends longitudinally through the bellows 98 and through a hole in the central axis of threaded plug 94.

Gas being pumped through gas line is always under a pressure, generally in the range of 100–250 p.s.i. It would thus be meaningless to provide a bellows sensor that would react to pressures lower than the lowest pressure within the gas line, and, similarly, it would be useless to provide a bellows that would react to pressures higher than the highest pressure of the gas. Accordingly, a pressure bellows must be provided with means for preventing bellows reaction below 100 p.s.i. and the full linear range of reaction of the bellows should take place within the range of, for example, 100–250 p.s.i. In the embodiment illustrated in FIGURE 2, bellows 98 is preloaded with a helical spring 104 which extends between threaded plug 94 and bellows end cap 102 to force end cap 102 toward the pressure input tube 24. The spring constant of spring 104 will depend upon the area of end cap 102 and the spring constant of bellows 98 and should be such that bellows 98 will not react to gas pressures below 100 p.s.i. It should be noted that minor variations in the spring constant of spring 104 may be adjusted or compensated by movement of threaded plug 24 within housing 90.

When suitable gas pressures are applied through pressure input tube 24, bellows 98 will react and this motion is translated to bellows push rod 26 which extends through the threaded plug 94 to the point where it is coupled to rocker arm 28. Because rocker arm 28 is pivoted somewhat near its center, and any rocker motion would thus follow an arcuate path, it is necessary that rocker arm 28 be loosely connected to the bellows push rod 26. Such a coupling may be accomplished by the use of a connecting link, or preferably by a loose fitting yoke 106 which loosely engages bellows push rod 26, and to which is pivotally connected one end of rocker arm 28. Yoke 106 will follow the lateral movement of bellows push rod 26, as shown in FIGURE 2, by the use of a C-ring 108 attached to the push rod 26 to exert force in one direction against yoke 106, and spring 109 engaged between the opposite side of yoke 106 and threaded plug 94. It can be seen that such construction permits the manual movement of needle indicator 44 in either direction without moving bellows push rod 26. Such manual adjustment of indicator 44 is desirable for check-out and calibration of the pressure integrator 16, and facilitates adjustment of adjustable cam 42.

As explained in connection with FIGURE 1, motion of the bellows push rod 26 is translated through rocker arm 28 and through connecting link 35 to elbow link 34, one end of which is connected to spur gear 36 at the other end of which is provided with a roller 40, which is adapted to roll against adjustable cam 42.

Adjustable cam 42 is shown in detail in FIGURE 3 and consists of a U-shaped channel member 110, provided with a plurality of holes which are tapped to receive a corresponding plurality of adjustment screws 112. Positioned between adjustment screws 112 on each side of channel member 110 is the cam 42, which may be comprised of a thin sheet of spring brass material having a length approximately equal to the length of the channel member 110 and a width which is somewhat greater than that of the channel member, so that the cam 42 can extend beyond the channel member 110 to engage roller 40. The purpose of the adjustable cam 42 is to provide minor corrections made necessary by nonlinearity of the bellows, nonlinearity of the gas compressibility factor, and also nonlinearity of the linkage motion caused by the arcuate path travelled by the ends of rocker arm 28.

FIGURE 4 illustrates the details of the temperature bellows 60. As shown in FIGURE 4, the temperature bellows is comprised of three separate and identical bellows arranged into a differential bellows system. This bellows system comprises a frame 114, which is preferably rectangularly shaped and having, located at one end, a pair of spaced flanges 116, which together act as a guide for the centrally located bellows. Positioned within frame 114 are three identical bellows 118, 120 and 122, with the bellows 120 generally centered on the longitudinal center line of frame 114 and the guide formed by flanges 116. Outer bellows 118 and 122 each have one end firmly affixed, and sealed, to frame 114 and the corresponding end of bellows 120 is attached to a plate 124, which is suitably shaped to slide in the guide formed between flanges 116. The opposite ends of bellows 118, 120 and 122 are firmly affixed to an end plate 126, which is of a suitable shape to slide freely within housing 114. Guide rods 128 attached to end plate 126 extend through guide holes located in the end of housing 114 to assure that bellows 118, 120 and 122 remain aligned in frame 114, and springs 130 around guide rods 128 between frame 114 and end plate 126 apply a force against all of the bellows for preloading the bellows.

A small tubing 58 which originates at the temperature bulb (FIGURES 5 and 6) is passed through a hole in the end of frame 114 and through end of plate 126 to the interior of bellows 120. Thus, volume changes caused by temperature variations within the gas pipe are translated only to bellows 120, which, with bellows 118 and 122 contains the same type of fluid that is contained in the temperature bulb in the gas pipe.

It should be noted that the bellows assembly illustrated in FIGURE 4 is a differential bellows. This is necessary because only the temperature sensed by the temperature bulb in the gas pipe must operate the bellows and any variations caused by temperature within the housing of the gas flow computer must be disregarded. If the temperature within the gas flow computer housing is high, the fluid within bellows 118, 120 and 122 will expand to force end plate 126 to a corresponding movement. However, plate 124 affixed to bellows 120 will remain stationary until such time that bellows 120 is forced to expand or contract because of temperature variations sensed by the temperature bulb and transmitted through capillary tube 58. Thus, plate 124 will only move within the guide formed by flanges 116 if there are temperature variations in the gas pipe, and will not be affected by temperature variations within the housing of the gas flow computer.

Connected to plate 124 and on the opposite side of bellows 120 is a push rod 62 which extends through a guide block 132 to a pair of spaced C-rings 134 and 136 that are affixed to push rod 62. Slidably positioned on push rod 62 and generally adjacent C-ring 134 is a yoke 138, which is pivotally connected to the center portion of elbow link 64. A spring 140 mounted on push rod 62 between C-ring 136 and yoke 138 forces the yoke 138 against C-ring 134. A second spring 142 on push rod 62 and located between plate 124 and guide block 132 exerts a force against plate 124 to eliminate mechanical hysteresis errors that may be in the material of bellows 120. As shown in FIGURE 1, elbow link 64 is provided with a roller 70 which rides on an adjustable cam 72 identical to that shown on FIGURE 3, and the other end of elbow link 64 is pivotally mounted to the periphery of a spur gear 66 which drives rack gear 68 and the carriage of transmission balls 56.

FIGURES 5 and 6 are sectional views illustrating a preferred embodiment of the temperature bulb which is inserted in the gas pipe and which actuates bellows 120. Since the gas in the gas pipe may be subjected to fairly rapid variations in temperature, it is necessary that such variations are rapidly transmitted to the temperature bellows 120. Accordingly, the temperature bulb illustrated in FIGURES 5 and 6 should be constructed of a metal having a high heat conductivity and should be constructed so that the fluid within the temperature bulb rapidly senses the heat changes. Thus, the heat bulb illustrated in FIGURES 5 and 6 may be constructed of a copper bar containing a plurality of holes, or tubes, 144, extending longitudinally through the bar so that the fluid within the bulb is exposed to a large area of the bulb. In each end of the bulb a counter bore 146 and 148 is provided to assure free circulation of the fluid through the tubes 144. The counter bores 146 and 148 are covered with end caps 150 and 152, respectively, and tubing 58 may extend through end cap 152 into counter bore 148. The entire temperature sensing system comprising tubes 144, counter bores 146 and 148, tubing 58 and bellows 118, 120 and 122 is filled with a fluid having a suitable coefficient of expansion, such as acetone, or preferably n-propanol.

It should be noted that temperature amplification is obtainable by varying the total volume of fluid within the temperature bulb. Thus, if the temperature bulb contains ten times as much fluid as the normal capacity of bellows 120, a variation in the volume of the fluid within the temperature bulb will cause a variation of bellows 120 that is ten times that which would be obtained if both the temperature bulb and bellows 120 were of equal volume.

FIGURE 7 is provided for the purpose of illustrating the relative positions of the various components within the housing of the instrument. This arrangement is substantially the same as is shown in the schematic illustration of FIGURE 1, which has been explained in detail. It is to be understood that such arrangement may be altered and that certain design changes may be made without departing from that the spirit of the invention.

What is claimed is:

1. A flow computer for correcting, to a standard of pressure and temperature, the flow of fluid through a pipe and flow meter, said computer comprising:
   input and output members,
   first and second ball and disk integrators, each having a ball carriage, said integrators being serially coupled between said input and output members of said computer,
   a pressure-responsive bellows system coupled to sense the pressure within the pipe,
   first linkage means coupled to said pressure-responsive bellows for actuating the ball carriage in said first ball and disk integrator in accordance with the fluid pressure in said pipe, a temperature-responsive bellows system coupled to sense the volume variations produced in a temperature bulb in said pipe by fluid temperature variations, said temperature responsive bellows system comprising:
   (1) a substantially rectangular frame member having an aperture in a first end substantially coaxial with the longitudinal center line of said frame member,
   (2) a first plate slidably positioned within said frame member and extending substantially parallel to said first end of said frame member,
   (3) a second plate slidably positioned within the aperture in said first end of said frame member extending substantially parallel with said first end,
   (4) a plurality of bellows elements positioned within said frame member between said first plate and said first end of said frame member, at least one of said bellows elements engaging said second plate,
   (5) tubing means extending through said first plate and substantially along the longitudinal center line of said frame member for communicating to at least one of said plurality of bellows a volume variation producing a pipe temperature bulb by corresponding temperature variations in the fluid in said pipe,
   (6) resilient means coupled between said frame member and said first plate for applying a contraction force to said plurality of bellows, and second linkage means coupled to said temperature-responsive bellows system for actuating the ball carriage in said second ball and disk integrator in accordance with the temperature of the fluid in said pipe.

2. A fluid flow computer, as claimed in claim 1, wherein said first linkage means comprises:
   a slidable shaft coupled to said pressure-responsive bellows and movable with said bellows along an axis parallel to the longitudinal axis of said bellows,
   a rack coupled to the ball carriage input shaft of said first ball and disk integrator,
   a pinion gear engaging said rack gear, and
   coupling means pivotally engaging said slidable shaft and a point on the radius of said pinion gear for producing rotation of said pinion gear according to the movement of said pressure-responsive bellows.

3. A fluid flow computer, as claimed in claim 1, wherein said second linkage means comprises:
   a slidable shaft coupled to said temperature-responsive bellows and movable with said bellows along an axis parallel to the longitudinal axis of said bellows,
   a rack gear coupled to the ball carriage input shaft of said second ball and disk integrator,
   a pinion gear engaging said rack gear, and
   coupling means pivotally engaging said slidable shaft and a point on the radius of said pinion gear for producing rotation of said pinion gear according to the movement of said temperature-responsive bellows.

4. A fluid flow computer, as claimed in claim 1, wherein the temperature bulb adapted to be positioned within a pipe for sensing temperature variations of the fluid within said pipe, comprising:
   a tubing member containing a plurality of longitudinal apertures therethrough,
   first and second sealing means enclosing the first and second ends of said tubing,
   means within said tubing for providing open communication between said plurality of apertures, and,
   tubing means coupled between the interior of said temperature bulb and said temperature-responsive bellows for communicating the temperature variations sensed by said bulb to said bellows.

5. A fluid flow computer, as claimed in claim 2, wherein said coupling means comprises:
   an elbow link having a center section and first and second end sections substantially at right angles to each other, the first end section being pivotally coupled to a point on the radius of said spur gear,
   an adjustable cam positioned to engage the second end section of said elbow link; and
   a rocker arm link pivoted between its ends, the first end of said link being pivotally coupled to said slidable shaft, the second end of said link being pivotally coupled to the center section of said elbow link.

6. A fluid flow computer, as claimed in claim 3, wherein said coupling means comprises:
   an elbow link having a center section and a first and second end section substantially at right angles to each other, the first end section being pivotally coupled to a point on the radius of said spur gear,
   an adjustable cam positioned to engage the second end section of said elbow link; and
   shaft means coupled to said temperature-responsive bellows system and to the center section of said elbow link for communicating to said elbow link the movements of said temperature-responsive bellows caused by temperature variations of the fluid in the pipe.

7. A fluid flow computer, as claimed in claim 5, wherein said adjustable cam comprises:
   a channel-shaped member having a base and a pair of parallel side walls,
   a flexible strip extending through the length of said member and extending beyond the side walls of said member to engage the second end section of said elbow link, and
   a plurality of adjustment screws positioned in each side wall of said member for adjusting the shape and for clamping said flexible strip.

8. A fluid flow computer, as claimed in claim 6, wherein said adjustable cam comprises:
   a channel-shaped member having a base and a pair of parallel side walls,
   a flexible strip extending through the length of said member and extending beyond the side walls of said member to engage the second end section of said elbow link, and
   a plurality of adjustment screws positioned in each side wall of said member for adjusting the shape and for clamping said flexible strip.

References Cited

UNITED STATES PATENTS

| Re. 13,760 | 6/1914 | Dowins | 73—233 |
| 2,397,467 | 4/1946 | Bush et al. | |
| 3,318,150 | 5/1967 | Rose | 73—233 |

FOREIGN PATENTS 1,023,039  12/1952  France.

RICHARD C. QUEISSER, Primary Examiner

R. S. SALZMAN, Assistant Examiner

U.S. Cl. X.R.

235—61